(12) United States Patent
Sacchetti et al.

(10) Patent No.: US 6,388,028 B2
(45) Date of Patent: *May 14, 2002

(54) COMPONENTS AND CATALYSTS FOR THE POLYMERIZATION OF OLEFINS

(75) Inventors: Mario Sacchetti; Illaro Cuffiani, both of Ferrara; Gianni Pennini, Porotto, all of (IT)

(73) Assignee: Basell Technology Company bv, Hoofddorp (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/878,681

(22) Filed: Jun. 19, 1997

Related U.S. Application Data

(63) Continuation of application No. 08/741,580, filed on Nov. 1, 1996, now abandoned, which is a continuation of application No. 08/163,571, filed on Dec. 8, 1993, now abandoned.

(30) Foreign Application Priority Data

Dec. 11, 1992 (IT) .......................................... MI92A2822

(51) Int. Cl.[7] .............................. C08F 4/64; C08F 4/642; C08F 4/643
(52) U.S. Cl. ........................... 526/124.3; 502/8; 502/9; 502/111; 502/134; 502/118; 502/126; 502/127; 526/123.1; 526/124.2
(58) Field of Search ................................ 502/8, 9, 111, 502/134, 118, 126, 127; 526/124.3, 123.1, 124.2

(56) References Cited

U.S. PATENT DOCUMENTS

| | | | |
|---|---|---|---|
| 3,953,414 A | 4/1976 | Galli et al. | 526/125 |
| 4,298,718 A | 11/1981 | Mayr et al. | 526/125 |
| 4,399,054 A | 8/1983 | Ferraris et al. | 252/429 B |
| 4,421,674 A * | 12/1983 | Invernizzi et al. | 526/125 |
| 4,469,648 A | 9/1984 | Ferraris et al. | 264/9 |
| 4,495,338 A | 1/1985 | Mayr et al. | 526/125 |
| 4,525,547 A * | 6/1985 | Kato et al. | 526/125 |
| 4,703,094 A * | 10/1987 | Raufast | 526/901 |
| 4,829,034 A | 5/1989 | Iiskolan et al. | 502/9 |
| 4,970,280 A * | 11/1990 | Chiba et al. | 526/68 |
| 4,971,937 A * | 11/1990 | Albizzati et al. | 526/125 |
| 4,978,648 A * | 12/1990 | Barbe et al. | 526/125 |
| 5,100,849 A | 3/1992 | Miya et al. | 502/9 |
| 6,054,406 A * | 4/2000 | Smith | 502/107 |

FOREIGN PATENT DOCUMENTS

| | | |
|---|---|---|
| EP | 65700 | 12/1982 |
| EP | 97131 | * 12/1983 |
| EP | 119963 | * 9/1984 |
| EP | 243327 | 10/1987 |
| EP | 281524 | 9/1988 |
| EP | 395083 | 10/1990 |
| EP | 0 423 861 | 4/1991 |
| EP | 0 553 805 | 8/1993 |
| EP | 0 553 806 | 8/1993 |

OTHER PUBLICATIONS

European Search Report for Application EP 93 11 9646 completed Mar. 31, 1994 with Annex.

* cited by examiner

Primary Examiner—Donald R. Wilson
Assistant Examiner—R. Rabago
(74) Attorney, Agent, or Firm—Bryan Cave LLP

(57) ABSTRACT

The present invention relates to spherical solid catalyst components for the polymerization of olefins, comprising a titanium compound, supported on a magnesium halide, containing more than one Ti-halogen link and optionally containing groups different from halogen in an amount lower than 0.5 mole per mole of Ti. Spherical solid compounds of the invention are characterized by having a surface area, measured by the BET method, of lower than 70 $m^2/g$, a total porosity, measured by the mercurium method, higher than 0.5 $cm^3/g$ and a pore radius such that at least 50% have values higher than 800 Å.

33 Claims, No Drawings

COMPONENTS AND CATALYSTS FOR THE POLYMERIZATION OF OLEFINS

This is a continuation of U.S. application Ser. No. 08/741,580, filed Nov. 1, 1996, now abandoned, which was a continuation of U.S. application Ser. No. 08/163,571, filed Dec. 8, 1993 now abandoned.

The present invention relates to catalyst components for the polymerization of olefins $CH_2=CHR$, wherein R is hydrogen or a hydrocarbon radical having 1–12 carbon atoms, the catalysts obtained therefrom and their use in the polymerization of said olefins.

Catalysts supported on magnesium dihalides in active form are well known in the literature. The first catalysts of this type are described in U.S. Pat. No. 4,298,718 and 4,495,338.

A further development to the supported catalysis has been given by the catalysts showing a controlled morphology, in particular having spherical shape. These catalysts are able to give polymers which, by duplicating the shape of the catalyst and showing good morphological properties, allow simplifications in the preparation and/or post treatment processes of polymers.

Examples of catalysts having controlled morphology are described in U.S. Pat. Nos. 3,953,414 and 4,399,054. In the latter patent the components are obtained starting from spherical adducts of $MgCl_2$ with about 3 mols of alcohol. The preparation of the catalytic component can be carried out in different ways, for example by lowering the alcohol content of the adduct, by treatment under vacuum, up to 2.5–2 mols for each $MgCl_2$ mole, then allowing the thus obtained support to react with $TiCl_4$. Alternatively the adduct containing about 3 moles of alcohol is treated with $AlEt_3$ and thereafter is reacted with $TiCl_4$. In each case components having a nitrogen porosity between 0.3 and 0.4 $cm^3/g$, a surface area between 300 and 500 $m^2/g$ and an average pore radius comprised between about 15 and 30 Å are obtained.

Catalysts prepared from $TiCl_4$ and granular $MgCl_2$ by spray-drying of an alcoholic magnesium chloride solution and subsequent supporting of the titanium compound are described in patent EP-B-65700 and EP-B-243327. However, the polymer obtained with these catalysts does not show morphological characteristics of interest. In particular, the bulk density is not sufficiently high. Furthermore, the activity of the catalyst is rather low.

A method for increasing the activity of these catalysts is described in patent EP-A-281524. The catalysts are prepared by supporting titanium alcoholates on a $MgCl_2$-ethanol adduct, containing from 18 to 25% by weight of ethanol, made spherical by spray-drying of the ethanol solution and subsequent chemical treatment with $Et_2AlCl$ or $Et_3Al_2Cl_3$. The conditions for the preparation of the support are critical and are reflected in the morphological stability of the polymer obtained. Polymers in form of heterogeneous powders are obtained, for example, using supports with an alcohol content not comprised within the critical range of 18–25or by using compounds different from $Et_2AlCl$ and $Et_3Al_2Cl_3$. Furthermore, in order to have sufficiently high yields, the Ti content in the solid component is always higher than 8% by weight.

Catalysts obtained from $MgCl_2$-alcohols adducts, wherein the adduct generally containing 3 mols of alcohol for each mole of $MgCl_2$ is dealcoholated by thermal treatment up to alcohol levels generally comprised between 0.2 and 2 mols and thereafter is reacted with an excess of titanium tetrachloride optionally containing a dissolved electron-donor compound, are known from the patent application EP-A-395083.

These catalysts are able to give polymers in the form of spheroidal particles with good morphological properties, in particular high bulk density.

The solid components of the catalysts described in EP-A-395083 are characterized by high surface areas and microporosity (more than 50% of the pore radius are higher than 100 Å, but lower than 800 Å).

Spherical catalyst components are now unexpectedly found for the polymerization of olefins having low values of surface area (measured by the BET method) and at the same time having high values of total porosity (measured by the mercurium method, hereinafter described) and distribution of the pore radius shifted towards values higher than 800 Å.

The components of the invention are able to give catalysts characterized by a high activity in the polymerization processes of olefins $CH_2=CHR$, wherein R is hydrogen or a hydrocarbon radical having 1–12 carbon atoms, and able to give polymers endowed with valuable morphological properties, in particular having high bulk density values notwithstanding the remarkable macroporosity of the solid components forming the catalyst. Therefore, they are particularly suited to the modern vapour phase polymerization processes of the olefins wherein the high productivity of catalysts must be accompanied by the morphological stability of the same.

The spherical components of the invention comprise a titanium compound, supported on a magnesium halide, containing more than one Ti-halogen bond and optionally containing groups different from halogen in amounts lower than 0.5 mole for each mole of titanium and are characterized by having a surface area, measured by the BET method, of lower than 70 $m^2/g$, a total porosity, measured by the merctrium method, of higher than 0.5 $cm^3/g$ and a pore radius such that at least 50% have values higher than 800 Å.

The total porosity is generally comprised between 0.6 and 1.2 $cm^3/g$ and the area is preferably comprised between 30 and 70 $m^2/g$. The porosity measured by the BET method is generally lower than 0.25 $cm^3/g$.

Spherical components of particular interest are furthermore characterized by the fact that at least 80% of pores have a radius up to 15,000 Å and porosity comprised between 0.6 and 0.9 $cm^3/g$.

The particles of solid component have substantially spherical morphology and average diameter comprised between 5 and 150 μm. As particles having substantially spherical morphology, those are meant wherein the ratio between the greater axis and the smaller axis is equal to or lower than 1.5 and preferably lower than 1.3.

Magnesium dihalides comprised in the spherical component of the invention are in the active form and are characterized by X-ray spectra in which the most intense diffraction line which appears in the spectrum of the non active halide is diminished in intensity and is substituted by a halo of which the maximum of intensity is shifted towards angles lower than those of the most intense line.

Preferably, the magnesium dihalide is $MgCl_2$.

The components of the invention-can also comprise an electron compound (internal donor), selected for example among ethers, esters, amines and ketones. Said compound is necessary when the component is used in the stereoregular (co)polymerization of olefins such as propylene, 1-butene, 4-methyl-pentene-1; the internal donor can be advantageously used also when wanting to prepare linear low density polyethylenes (LLD-PE) having a narrow molecular weight distribution.

In particular, the internal electron donor compound can be selected from the alkyl, cycloalkyl and aryl ether and esters of polycarboxylic acids, such as for example esters of phthalic and maleic acid, in particular n-butylphthalate, di-isobutylphthalate, di-n-octylphthalate.

Other electron donor compound advantageously used are the 1,3-diethers of the formula:

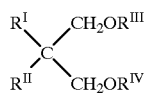

wherein $R^I$, $R^{II}$, the same or different from each other, are alkyl, cycloalkyl, aryl radicals having 1–18 carbon atoms and $R^{III}$, $R^{IV}$, the same or different from each other, are alkyl radicals having 1–4 carbon atoms.

The electron donor compound is generally present in molar ratio with respect to the magnesium comprised between 1:4 and 1:20.

The preferred titanium compounds have the formula $Ti(OR)_nX_{y-n}$, wherein n is a number comprised between 0 and 0.5 inclusive, y is the valency of titanium, R is an alkyl, cycloalkyl or aryl radical having 2–8 carbon atoms or a COR group, X is halogen. In particular R can be n-butyl, isobutyl, 2-ethylhexyl, n-octyl and phenyl; X is preferably chlorine.

If y is 4, n varies preferably from 0 to 0.02; if y is 3, n varies preferably from 0 to 0.015.

Components of the invention form catalysts, for the polymerization of alpha-olefins $CH_2$=CHR wherein R is hydrogen or a hydrocarbon radical having 1–12 carbon atoms by reaction with Al-alkyl compounds. In particular Al-trialkyl compounds, for example Al-trimethyl, Al-triethyl, Al-tri-n-butyl, Al-triisobutyl are preferred. The Al/Ti ratio is higher than 1 and is generally comprised between 20 and 800.

In the case of the stereoregular polymerization of α-olefins such as for example propylene and 1-butene, an electron donor compound (external donor) which can be the same or different from the compound used as internal donor is also generally used in the preparation of the catalyst.

In the case in which the internal donor is an ester of a polycarboxylic acid, in particular a phthalate, the external donor is preferably selected from the silane compounds containing at least a Si-OR link, having the formula $R^I_{4-n}Si(OR^{III})_n$, wherein $R^I$ is an alkyl, cycloalkyl, aryl radical having 1–18 carbon atoms, $R^{III}$ is an alkyl radical having 1–4 carbon atoms and n is a number comprised between 1 and 3. Examples of these silanes are methyl-cyclohexyl-dimethoxysilane, diphenyl-dimet-hoxysilane, methyl-t-butyl-dimethoxysilane.

It is possible to advantageously use also the 1,3 diethers having the previously described formula. In the case in which the internal donor is one of these diethers, the use of an external donor can be avoided, as the stereospecificity of the catalyst is already sufficiently high.

A method suitable for the preparation of spherical components of the invention comprises the reaction between:
  (a) a compound $MgCl_2 \cdot mROH$, wherein $0 \leq m \leq 0.5$ and R is an alkyl, cycloalkyl or aryl radical having 1–12 carbon atoms;
  (b) a titanium compound of the formula $Ti(OR)_nX_{y-n}$, in which n is comprised between 0 and 0,5, y is the valency of titanium, X is halogen and R is an alkyl radical having 2–8 carbon atoms or a COR group.

The compound (a) is prepared by chemical dealcoholation of adducts $MgCl_2 \cdot pROH$, with $0.1 \leq p \leq 2$, in turn obtained by thermal dealcoholation of adducts $MgCl_2 \cdot qROH$, wherein $2.5 \leq q \leq 3.5$. In the reaction between the compound (b) and the compound (a) the molar ratio Ti/Mg is stoichiometric or higher; preferably this ratio in higher than 3. The Ti/Mg molar ratio may also be from 0.05 to 3.

The process can also comprise the use of an electron donor compound (internal donor) of the previously described type in the reaction step between the compound (a) and the titanium compound (b). Molar ratios between internal donor and magnesium halide are generally comprised between 1:2 and 1:20.

Adducts $MgCl_2 \cdot qROH$ are prepared in spherical form from molten adducts by emulsifying them in liquid hydrocarbon and thereafter solidifying them by quick cooling. Representative methods for the preparation of these spheralized adducts are reported in U.S. Pat. No. 4,469,648, whose description is herein included as reference. Another useable method for the spheralization is spray cooling described in U.S. Pat. No. 5,100,849 and 4,829,034 whose description is herein included as reference. Spheralized adducts thus obtained are subjected to thermal dealcoholation at temperatures comprised between 50 and 150° C. until the alcohol content is reduced to values lower than 2 and preferably comprised between 1.5 and 0.3 moles per mole of magnesium dihalide and finally treated with chemical reagents able to react with OH groups of the alcohol and further dealcoholate the adduct until the content is reduced to values comprised between 0 and 0.5 moles per mole of Mg, preferably lower than 0.3 moles.

The treatment with chemical dealcoholating agents is carried out using sufficient amounts of agent to react with the OH present in the alcohol of the adduct. It is preferable to work with a slight excess of said agent which is then separated before reacting the titanium compound with the so obtained support.

The chemical dealcoholating agents comprise for example Al-alkyl compounds, such as for example $Al(C_2H_5)_3$, $Al(C_2H_5)_2Cl$, $Al(iBu)_3$, halogenated Si and Sn compounds such as $SiCl_4$ and $SnCl_4$.

Preferred titanium compounds (b) are titanium tetrahalides, in particular $TiCl_4$. In this case the compound obtained after chemical dealcoholation is suspended at low temperature, in an excess of $TiCl_4$. The suspension is then heated at temperatures comprised between 80 and 135° C. and is kept this temperature for a time period comprised between 0.5 and 2 hours. The excess titanium is separated at high temperatures by filtration or sedimentation and siphoning, also carried out at high temperatures. The treatment with $TiCl_4$ can optionally be repeated many times. The treatment with $TiCl_4$ may also be carried out in hydrocarbon solution.

In the case in which the catalytic component must comprise an internal electron donor of the previously described type, this can be advantageously added during the treatment with $TiCl_4$, using the previously described molar ratios with respect to the magnesium.

If the titanium compound is a solid, such as for example $TiCl_3$, this can be supported on the magnesium halide by dissolving it in the starting molten adduct.

If the chemical dealcoholation of the adduct $MgCl_2 \cdot pROH$ is carried out with agents having the capacity to reduce, for example an Al-alkyl compound such as Al-triethyl, the so obtained compound, before the reaction with the titanium compound, can be treated with a deactivating agent, for example $O_2$ or an alcohol, in order to deactivate the Al-triethyl optionally still present thus avoiding the reduction of the titanium compound.

The treatment with deactivating agents is avoided when it is desired to at least partially reduce the titanium compound. If, on the contrary, a higher degree of reduction of the titanium compound is desired, the process for the preparation of the component can advantageously comprise the use of reducing agents.

As examples of reducing compounds, Al-alkyls and the Al-alkyl halides or the silicon compounds, such as polyhydrosiloxanes, can be mentioned.

As previously indicated the spherical components of the invention and catalysts obtained therefrom find applications in the processes for the preparation of several types of olefinic polymers.

For examples the following can be prepared: high density ethylene polymers (HDPE, having a density higher than 0.940 g/cc), comprising ethylene homopolymers and copolymers of ethylene with alpha-olefins having 3–12 carbon atoms; linear low density polyethylenes (LLDPE, having a density lower than 0.940 g/cc) and very low density and-ultra low density (VLDPE and ULDPE, having a density lower than 0.920 g/cc, to 0.880 g/cc) consisting of copolymers of ethylene with one or more alpha-olefins having from 3 to 12 carbon atoms, having a mole content of units derived from the ethylene higher than 80%; elastomeric copolymers of ethylene and propylene and elastomeric terpolymers of ethylene and propylene with smaller proportions of a diene having a content by weight of units derived from the ethylene comprised between about 30 and 70%, isotactic polypropylenes and crystalline copolymers of propylene and ethylene and/or other alpha-olefins having a content of units derived from propylene higher than 85% by weight; shock resistant polymers of propylene obtained by sequential polymerization of propylene and mixtures of propylene with ethylene, containing up to 30% by weight of ethylene; copolymers of propylene and 1-butene having a number of units derived from 1-butene comprised between 10 and 40% by weight.

The polymerization of olefins in the presence of catalysts obtained from the catalytic components of the invention can be carried out according to known techniques either in liquid or gas phase using for example the known technique of the fluidized bed or under conditions wherein the polymer is mechanically stirred.

Examples of processes wherein it is possible to use the spherical components of the invention are described in Italian patent applications MI-91-A-000379 and MI-92-A-000589. In this process a precontacting step of the catalyst components, a prepolymerization step and a gas phase polymerization step in one or more reactors in a series of fluidized or mechanically stirred bed are comprised.

The following examples are given to illustrate and not to limit the invention itself.

The properties indicated are determined according to the following methods:

Porosity and surface area with nitrogen: are determined according to the B.E.T. method (apparatus used SORPTOMATIC 1900 by Carlo Erba).

Porosity and surface area with mercury: are determined by immersing a known amount of mercury into the dilatometer and then hydraulically increasing the mercury pressure in a gradual manner to 2000 kg/cm². The pressure of introduction of the mercury into the pores depends on the diameters of the pores themselves. The measure is carried out using a porosimeter "Porosimeter 2000 series" by Carlo Erba. The porosity, the distribution of pores and the surface area is calculated from the data of the volume reduction of the mercury and applied pressure values.

Size of the catalyst particles: are determined according to a method based on the principle of the optical diffraction of the laser monochromatic light by means of the apparatus "Malvern Instr. 2600".

MIE flow index: ASTM-D 1238

MIF flow index: ASTM-D 1238

Flowability: is the time employed for 100 g of polymer to flow through a funnel having an outlet hole of 1.25 cm diameter and the walls having a 20° inclination to the vertical.

Bulk density: DIN-53194

Morphology and granulometric distribution of the polymer particles: ASTM-D 1921-63

Fraction soluble in xylene: determined at 25° C.

Comonomer content: percentage by weight of comonomer determined by I.R. spectrum.

Effective density: ASTM-D 792

EXAMPLE
PREPARATION OF THE SPHERICAL SUPPORT (ADDUCT $MgCl_2$ EtOH)

A magnesium chloride and alcohol adduct was prepared following the method described in example 2 of U.S. Pat. No. 4,399,054, but working at 2000 RPM instead of 10000 RPM.

The adduct containing about 3 mols of alcohol had an average size of about 60 $\mu$m with a dispersion range of about 30–90 $\mu$m.

EXAMPLE 1
Preparation of the Solid Component

The spherical support, prepared according to the general method underwent a thermal treatment, under $N_2$ stream, over a temperature range of 50–150° C. until spherical particles having a residual alcohol content of about 35% (1.1 mole of alcohol for each $MgCl_2$ mole) were obtained.

2700 g of this support were introduced into a 60 l autoclave together with 38 l of anhydrous hexane. Under stirring and at room temperature 11.6 litres of hexane solution containing 100 g/l of $AlEt_3$ were fed over 60 minutes. The temperature was raised to 50° C. over 60 minutes and was maintained at that temperature for a further 30 minutes whilst stirring. The liquid phase was removed by decanting and siphoning; the treatment with $AlEt_3$ was repeated twice again under the same conditions. The spherical product obtained was washed three times with anhydrous hexane and dried at 50° C. under vacuum.

The thus obtained support showed the following characteristics:

| | |
|---|---|
| porosity (Hg) | 1.144 cm³/g |
| surface area (Hg) | 15.2 m²/g |
| OEt residual | 5.5% (by weight) |
| Al residual | 3.6% (by weight) |
| Mg | 20.4% (by weight) |

Into a 72 l steel reactor provided with stirrer, 40 litres of $TiCl_4$ were introduced; at room temperature and whilst stirring 1900 g of the above described support were introduced. The whole was heated to 100° C. over 60 minutes and these conditions were maintained for a further 60 minutes. The stirring was interrupted and after 30 minutes the liquid phase was separated from the sedimented solid. Two further treatments were carried out under the same conditions with the only difference that in the first of these treatment it was carried out at 120° C. and in the second at 135° C. Thereafter 7 washings with anhydrous hexane (about 19 litres) were carried out three of which were carried out at 60° C. and 4 at room temperature. 2400 g of component in spherical form were obtained which, after drying under vacuum at about 50° C., showed the following characteristics:

| Total titanium | 6% (by weight) |
| --- | --- |
| $Ti^{III}$ | 4.9% (by weight) |
| Al | 3% (by weight) |
| Mg | 12.2% (by weight) |
| Cl | 68.2% (by weight) |
| OEt | 0.3% (by weight) |
| porosity (B.E.T.) | 0.208 cm³/g, of which 50% was due to pores with radius >300 Å |
| surface area (B.E.T.) | 56.2 m²/g |
| total porosity (Hg) | 0.674 cm³/g, 50% of which was due to pores with radius >1250 Å. 91% of pores have a radius up to 15000 Å. |
| surface area (Hg) | 21 m²/g |

Ethylene Polymerization (HDPE)

Into a 2.4 litre stainless steel autoclave, degassed under $N_2$ stream at 70° C., 2000 cc of anhydrous hexane, 0.0095 g of spherical component and 0.5 g of Al-triisobutyl were introduced. The whole was stirred, heated to 75° C. and thereafter 4 bar of $H_2$ and 7 bar of ethylene were fed. The polymerization lasted 3 hours during which ethylene was fed to keep the pressure constant. 350 g of polymer was obtained having the following characteristics:

| MIE | | 0.12 g/10 min |
| --- | --- | --- |
| MIF/MIE | | 120 |
| effective density | | 0.960 g/cm³ |
| bulk density | | 0.32 g/cm³ |
| flowability | | 11 seconds |
| morphology | | spherical |
| P.S.D. | >4000 μm | 0.6% (by weight) |
| | 2000–4000 μm | 87.8% (by weight) |
| | 1000–2000 μm | 11% (by weight) |
| | 500–1000 μm | 0.3% (by weight) |
| | <500 μm | 0.3 (by weight) |

EXAMPLE 2

Into the same autoclave as example 1, after having fed 0.0122 g of spherical component and 0.5 g of Al-isobutyl at a temperature of 30° C., 7 bar of ethylene and 4 bar of $H_2$ were fed. This was kept at 30° C. until the system had adsorbed about 5 g of ethylene. Then the whole was heated to 75° C. and was polymerized for 3 hours feeding ethylene in order to maintain the pressure constant. 290 g of polymer were obtained having the following characteristics:

| MIE | | 0.15 g/10 min |
| --- | --- | --- |
| MIF/MIE | | 120 |
| Bulk density | | 0.36 g/cm³ |
| flowability | | 11 sec |
| morphology | | spherical |
| P.D.S. | >4000 μm | 0.1% (by weight) |
| | 2000–4000 μm | 69.7% (by weight) |
| | 1000–2000 μm | 29.3% (by weight) |
| | 500–1000 μm | 0.4% (by weight) |
| | <500 μm | 0.5% (by weight) |

EXAMPLE 3

80 g of the support obtained according to example 1, after the treatment with $AlEt_3$ were treated with dry air in fluid bed for about 4 hours at a temperature of 40° C. After this treatment the support was fed into a reactor in which 800 cc of $TiCl_4$ at room temperature were contained. Under thorough stirring the mixture was slowly heated to 100° C. and then was kept under these conditions for 60 min. The stirring was stopped and after having allowed the solid to decant, the liquid phase was separated by siphoning. Two further treatments under the same conditions were carried out with the only difference in that the first of these treatments was carried out at 120° C. and the second was carried out at 135° C. Thereafter 7 washings were carried out; three of these at 60° C. and 4 at room temperature, with anhydrous hexane at the concentration of about 100 g/l. The component in spherical form was dried under vacuum at 50° C. and showed the following characteristics:

| Total titanium | 3.1% (by weight) |
| --- | --- |
| $Ti^{III}$ | <0.1% (by weight) |
| Mg | 19.1% (by weight) |
| Cl | 67.9% (by weight) |
| OEt residual | 0.6% (by weight) |
| Al | 3.5% (by weight) |
| porosity (B.E.T.) | 0.155 cm³/g, 50% of which is due to pores with radius >300 Å |
| surface area (B.E.T.) | 57.8 m²/g |
| total porosity (Hg) | 0.751 cm³/g, 50% of which was due to pores with radius >1600 Å. 90% of pores have a radius up to 15000 Å. |
| surface area (Hg) | 26.8 m²/g |

Ethylene Polymerization (HDPE) 0.0106 g of spherical component were used in the ethylene polymerization under the same conditions described in example 1.

380 g of polymer were obtained having the following characteristics:

| MIE | | 0.565 g/10 min |
| --- | --- | --- |
| MIF/MIE | | 90 |
| bulk density | | 0.34 g/cc |
| morphology | | spherical |
| flowability | | 12 sec |
| P.S.D. | >4000 μm | 0.3% (by weight) |
| | 2000–4000 μm | 85.3% (by weight) |
| | 1000–2000 μm | 13.7% (by weight) |
| | 500–1000 μm | 0.5% (by weight) |
| | <500 μm | 0.1% (by weight) |

EXAMPLE 4

100 g of the support obtained according to the example 1 after treatment with $AlEt_3$ were introduced into a 1 litre glass reactor provided with stirrer. Subsequently 500 cc of anhydrous heptane and, over about 10 min., 70 g of $TiCl_4$ were fed. The mixture was stirred for 30 min. at room temperature. Slowly 200 cc of a mixture containing 100 cc of $Al_2Et_3Cl_3$ and 100 cc of anhydrous hexane were fed. Under stirring the mixture was slowly heated to 98° C. and then was kept under these conditions for 2 hours. The stirring was stopped and the liquid phase was removed by sedimentation and siphoning. Thereafter 4 washings of the solid were carried out; 2 washings at 60° C. and 2 at room temperature, using 800 cc of anhydrous hexane in each washing. At the end the solid was dried at 500° C. under vacuum. 117 g of spherical component were obtained having the following characteristics:

| | |
|---|---|
| Total titanium | 9.75% (by weight) |
| Ti$^{III}$ | 9.25% (by weight) |
| Al | 2.5% (by weight) |
| Mg | 13.9% (by weight) |
| Cl | 67.6% (by weight) |
| OEt | 0.6% (by weight) |
| porosity (B.E.T.) | 0.182 cc/g, 50% of which was due to pores with radius >150 Å |
| surface area (B.E.T.) | 59 m$^2$/g |
| total porosity (Hg) | 1.093 cc/g, 50% of which was due to pores with radius >3000 Å |
| Surface area (Hg) | 30 m$^2$/g |

Ethylene Polymerization (HDPE)

0.075 g of spherical component were used to polymerize ethylene under the conditions described in the example 1. 390 g of polymer was obtained, having the following characteristics:

| | | |
|---|---|---|
| MIE | | 0.15 g/10 min |
| MIF/MIE | | 66.6 |
| bulk density | | 0.30 g/cm$^3$ |
| morphology | | spherical |
| flowability | | 14 sec |
| P.S.D. | >4000 μm | 2.5% (by weight) |
| | 2000–4000 μm | 86.2% (by weight) |
| | 1000–2000 μm | 11.5% (by weight) |
| | 500–1000 μm | 0.3% (by weight) |
| | <500 μm | 0.2% (by weight) |

What is claimed is:

1. Spherical catalyst components for the polymerization of olefins CH$_2$=CHR, wherein R is hydrogen or hydrocarbon radical having 1–12 carbon atoms, comprising a titanium compound, supported on an active magnesium halide possessing an x-ray spectrum in which the most intense diffraction line that appears in a spectrum of a non-active magnesium halide is diminished in intensity and substituted by a halo of which the maximum intensity is shifted towards angles lower than those of the most intense line, and the spherical catalyst components contain more than one Ti-halogen bond and optionally contains groups different from halogen in amounts lower than 0.5 mole for each mole of Ti, said components having a surface area, determined by the BET method, of lower than 70 m$^2$/g, a total porosity, measured by the mercury method, between 0.6 and 1.2 cm$^3$/g and a pore radius distribution such that at least 50% have values higher than 800 Å.

2. Spherical components according to claim 1 wherein the total porosity is comprised between 0.6 and 1.2 cc/g and the surface area, measured by the BET method is comprised between 30 and 70 m$^2$/g.

3. Spherical components according to claim 2 wherein at least 80% of pores have a radius up to 15000 Å and the porosity is comprised between 0.6 and 0.9 cc/g.

4. Spherical components according to claim 1 comprising an electron donor compound (internal donor) in molar ratios with respect to the magnesium halide comprised between 1:2 and 1:20.

5. Spherical components according to claim 1 wherein the magnesium halide is MgCl$_2$.

6. Spherical components according to claim 1 wherein the titanium compound has the formula Ti(OR)$_n$X$_{y-n}$, wherein n is comprised between 0 and 0.5 inclusive, y is the valence of titanium, X is halogen and R is an alkyl, cycloalkyl or aryl radical having 2–8 carbon atoms or a COR group.

7. Spherical components according to claim 6, wherein y is 4 and n is from 0 to 0.02.

8. Spherical components according to claim 6, wherein y is 3 and n is from 0 to 0.015.

9. Spherical components according to claim 4 wherein the electron donor compound is selected from ethers and alkyl, cycloalkyl, and aryl esters of polycarboxylic acids.

10. Spherical components according to claim 4 wherein the electron donor compound is selected from 1,3-diethers of the formula:

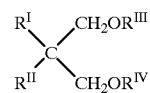

wherein R$^I$ and R$^{II}$, the same or different from each other, are alkyl, cycloalkyl, or aryl radicals having 1–18 carbon atoms and R$^{III}$ and R$^{IV}$, the same or different from each other, are alkyl radicals having 1–4 carbon atoms.

11. Catalysts for the polymerization of olefins comprising the reaction product between the components according to claim 1 and an Al-alkyl compound.

12. Catalysts according to claim 11 wherein the Al-alkyl compound is an Al-trialkyl.

13. Catalysts for the polymerization of olefins comprising the reaction product between the component according to claim 4 and an Al-alkyl compound.

14. Catalysts for the polymerization of olefins comprising the reaction product between the components according to claim 4, an Al-alkyl compound and an electron donor compound (external donor).

15. Catalysts according to claim 14 wherein the external electron donor compound is selected from 1,3-diethers of the formula:

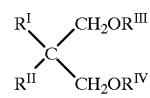

wherein R$^I$ and R$^{II}$, the same or different from each other, are alkyl, cycloalkyl, or aryl radicals having 1–18 carbon atoms, and R$^{III}$ and R$^{IV}$, the same or different from each other, are alkyl radicals having 1–4 carbon atoms.

16. Catalysts for the polymerization of olefins comprising the reaction product between the component according to claim 9, an Al-alkyl compound and an electron donor compound (external donor) selected from silanes having formula R$^I_{4-n}$Si(OR$^{III}$)$_n$, wherein R$^I$ is an alkyl, cycloalkyl, or aryl radical having 1–18 carbon atoms, R$^{III}$ is an alkyl radical having 1–4 carbon atoms, and n is a number comprised between 1 and 3.

17. Process for the preparation of spherical catalyst components for the polymerization for olefins CH$_2$=CHR, wherein R is hydrogen or hydrocarbon radical having 1–12 carbon atoms, comprising
   (i) the chemical dealcoholation of adducts MgCl$_2$.pROH, with 0.1≦p≦2, to form an MgCl$_2$.mROH compound, wherein 0≦m≦0.5 and R is an alkyl, cycloalkyl or aryl radical having 1–12 carbon atoms; and
   (ii) reacting the MgCl$_2$.mROH compound with a titanium compound of formula Ti(OR)$_n$X$_{y-n}$, wherein n is comprised between 0 and 0.5 inclusive, y is the valence of titanium, X is halogen and R is an alkyl radical having, 2–8 can atoms or a COR group.

18. Process according to claim 17, wherein in the reaction between the Ti(OR)$_n$X$_{y-n}$ compound and the MgCl$_2$.mROH compound in step (ii), the Ti/Mg molar ratio is from 0.05 to 3.

19. Process according to claim 17, wherein in the reaction between the Ti(OR)$_n$X$_{y-n}$ compound and the MgCl$_2$.mROH compound in step (ii), the Ti/Mg molar ratio is higher than 3.

20. Process according to claim 17, wherein the reaction in step (ii) is carried out in the presence of an electron donor compound (internal donor), the molar ratio between the electron donor compound and the magnesium halide being from 1:2 to 1:20.

21. Process according to claim 17, wherein the titanium compound is TiCl$_4$.

22. Process according to claim 21, wherein the reaction in step (ii) is carried out in liquid TiCl$_4$ or in hydrocarbon solution.

23. Process according to claim 17, wherein the dealcoholation of adducts MgCl$_2$.pROH is carried out with Al-alkyl compounds.

24. Process according to claim 23, wherein in step (ii), the compound MgCl$_2$.mROH_compound, before the reaction with the Ti(OR)$_n$X$_{y-n}$ compound, is treated with an agent deactivating the Al-alkyl compounds.

25. Process according to claim 24, wherein the deactivating agent is oxygen.

26. Process according to claim 17, comprising the use of a reducing compound in step (ii).

27. Process according to claim 26, wherein the reducing compound is an Al-trialkyl or an Al-alkyl halide.

28. Process according to claim 27, wherein the reducing compound is Al$_2$Et$_3$ Cl$_3$.

29. Process for the polymerization of olefins CH$_2$=CHR, wherein R is hydrogen or a hydrocarbon radical having 1–12 carbon atoms, comprising the use of catalysts according to claim 11.

30. Process for the polymerization of ethylene and mixtures thereof with olefins CH$_2$=CHR$^v$ wherein R$^v$ is an alkyl, cycloalkyl or aryl radical having 1–12 carbon atoms, optionally in the presence of smaller proportions of a diene, comprising the use of catalysts according to claim 11.

31. Process according to claim 30, wherein the olefin CH$_2$=CHR$^v$ is selected from 1-butene, 1-pentene, 1-hexene, 4-methylpentene-1, and 1-octene.

32. Process for the polymerization of propylene and mixtures thereof with olefins CH$_2$=CHR, wherein R is hydrogen or a hydrocarbon radical optionally in the presence of smaller proportions of a diene, comprising the use of catalysts according to claim 14.

33. The process according to claim 17, wherein adducts MgCl$_2$.pROH are obtained by thermal dealcoholation of adducts MgCl$_2$.qROH, wherein $2.5 \leq q \leq 3.5$.

* * * * *

UNITED STATES PATENT AND TRADEMARK OFFICE
CERTIFICATE OF CORRECTION

PATENT NO.    : 6,388,028 B2                                              Page 1 of 1
DATED         : May 14, 2002
INVENTOR(S)   : Mario Sacchetti et al.

It is certified that error appears in the above-identified patent and that said Letters Patent is hereby corrected as shown below:

Column 10,
Line 62, after "having" please delete the comma.
Line 63, please change "can" to -- carbon --.

Signed and Sealed this

Fifth Day of August, 2003

JAMES E. ROGAN
*Director of the United States Patent and Trademark Office*